United States Patent
Wu et al.

(10) Patent No.: US 12,286,687 B1
(45) Date of Patent: Apr. 29, 2025

(54) POLYMETALLIC-ORE BENEFICIATION AND SEPARATION REAGENT, PREPARATION METHOD AND USE THEREOF

(71) Applicant: Beijing LRS Technology Co., Ltd., Beijing (CN)

(72) Inventors: Bozeng Wu, Beijing (CN); Hongxin Qiu, Beijing (CN); Xiaohao Sun, Beijing (CN)

(73) Assignee: Beijing LRS Technology Co., Ltd., Beijing (CN)

( * ) Notice: Subject to any disclaimer, the term of this patent is extended or adjusted under 35 U.S.C. 154(b) by 0 days.

(21) Appl. No.: 18/948,585

(22) Filed: Nov. 15, 2024

(30) Foreign Application Priority Data

Mar. 14, 2024 (CN) .......................... 202410288868.X

(51) Int. Cl.
| | | |
|---|---|---|
| *C22B 3/16* | (2006.01) | |
| *C22B 3/00* | (2006.01) | |
| *C22B 3/22* | (2006.01) | |
| *C22B 11/00* | (2006.01) | |
| *C22B 15/00* | (2006.01) | |
| *C22B 19/20* | (2006.01) | |

(52) U.S. Cl.
CPC ................ *C22B 3/165* (2013.01); *C22B 3/22* (2013.01); *C22B 11/04* (2013.01); *C22B 13/04* (2013.01); *C22B 15/0086* (2013.01); *C22B 19/20* (2013.01)

(58) Field of Classification Search
CPC ........... C22B 3/165; C22B 3/22; C22B 11/04; C22B 13/04; C22B 15/0086; C22B 19/20
See application file for complete search history.

(56) References Cited

FOREIGN PATENT DOCUMENTS

| | | |
|---|---|---|
| CA | 3218484 A1 | 11/2022 |
| CN | 101337205 A | 1/2009 |
| CN | 102166545 A | 8/2011 |
| CN | 102327815 A | 1/2012 |
| CN | 102464599 A | 5/2012 |
| CN | 104918698 A | 9/2015 |
| CN | 107141241 A | 9/2017 |
| CN | 109926196 A | 6/2019 |
| CN | 116532244 A | 8/2023 |
| CN | 117399159 A | 1/2024 |
| WO | 2018002680 A1 | 1/2018 |

*Primary Examiner* — Adil A. Siddiqui
(74) *Attorney, Agent, or Firm* — Bayramoglu Law Offices LLC

(57) ABSTRACT

The present disclosure provides a polymetallic-ore beneficiation and separation reagent, a preparation method therefor and use thereof. The preparation method for a polymetallic-ore beneficiation and separation reagent, includes following steps: (1) mixing a substance A, caustic soda, soda ash and sodium polysulfide, and then heating the same and performing a catalytic reaction, to render an intermediate product B, wherein the substance A includes one or more of urea, glycine, urea peroxide, ammonium cyanate and isocyanic acid; and (2) mixing the intermediate product B with trichloroisocyanuric acid, dichloroisocyanuric acid and 2-amino-3-(4-imidazolyl)propanoic acid, to render the polymetallic-ore beneficiation and separation reagent.

9 Claims, No Drawings

POLYMETALLIC-ORE BENEFICIATION AND SEPARATION REAGENT, PREPARATION METHOD AND USE THEREOF

CROSS-REFERENCE TO RELATED APPLICATION

The present disclosure claims the priority to the Chinese patent application with the filing No. 202410288868X filed with the China National Intellectual Property Administration on Mar. 14, 2024 and entitled "POLYMETALLIC-ORE BENEFICIATION AND SEPARATION REAGENT, PREPARATION METHOD THEREFOR AND USE THEREOF", the contents of which are incorporated herein by reference in entirety.

TECHNICAL FIELD

The present disclosure relates to the technical field of beneficiation, and specifically to a polymetallic-ore beneficiation and separation reagent (i.e., a beneficiation and separation reagent for polymetallic ore), a preparation method therefor and use thereof.

BACKGROUND ART

Copper, lead, zinc and gold, as important colored metal resources, have been widely used in fields such as electric power, transportation, new energy materials and photovoltaic industries. With the continuous development of economy, demand for copper, lead, zinc and gold is also increasing. With rapid development of high-quality and high-grade mineral resources, recovery of low-grade refractory polymetallic ores has attracted increasing attention.

In porphyry type copper deposits, chalcopyrites are main copper-containing minerals, and usually exist in association with pyrites. Currently, high-alkali separation is mainly used in a process of copper-sulfur flotation separation, that is, pH of a pulp is adjusted to 12-13 by adding a large amount of lime so as to inhibit pyrites. The use of a large amount of lime easily causes presence of a large amount of calcium ions in the flotation pulp, which causes incrustation of equipment or pipelines, and increases failure rates of the equipment. At the same time, the use of a large amount of lime will also cause associated molybdenum metal and rhenium metal in orebody to be suppressed, thus reducing corporate revenues.

At present, in polymetallic lead-zinc sulfide deposits, lead-zinc flotation separation usually takes cyanide as a flotation inhibitor. As a highly toxic substance, a large amount of cyanide used not only causes harm to the environment, but also affects physical health of workers. Meanwhile, cyanide is also usually used as a lixiviant for gold in a leaching process of gold ores. Therefore, it is of great significance to find a novel, low-toxicity and environment-friendly beneficiation and separation reagent to achieve low-alkali copper-sulfur separation, lead-zinc sorting and leaching of gold.

In view of this, the present disclosure is specifically proposed.

SUMMARY

The first objective of the present disclosure is to provide a preparation method for a polymetallic-ore beneficiation and separation reagent, by mixing a stable complex structure formed by cyanuric acid salts and derivatives thereof prepared by melt polymerization with trichloroisocyanuric acid, dichloroisocyanuric acid and 2-amino-3-(4-imidazolyl)propanoic acid, wherein cyano radicals in a molecular structure bond to atoms such as sulfur and oxygen and are dissolved out in a form of cyanate, without generation of free cyanide ions. The beneficiation and separation reagent prepared by the method of the present disclosure can realize low-alkali copper-sulfur separation, can replace cyanide to realize lead-zinc sorting and leaching of gold, has the advantages of green, low toxicity and environmental protection, and has better sorting and leaching effects.

The second objective of the present disclosure is to provide a polymetallic-ore beneficiation and separation reagent, prepared by the preparation method as described above. The polymetallic-ore beneficiation and separation reagent can realize separation of lead-zinc minerals, low-alkalinity separation of copper-sulfur minerals and leaching of gold ores after bulk flotation, with good separation effects, strong stability, and strong adaptability, thus solving the technical difficulties of high toxicity brought about by use of cyanide and a large amount of lime caused by high-alkalinity separation in the conventional beneficiation process.

The third objective of the present disclosure is to provide use of the polymetallic-ore beneficiation and separation reagent as described above in copper-sulfur flotation separation.

The fourth objective of the present disclosure is to provide use of the polymetallic-ore beneficiation and separation reagent as described above in lead-zinc flotation separation.

The fifth objective of the present disclosure is to provide use of the polymetallic-ore beneficiation and separation reagent as described above in leaching gold ores.

In order to realize the above objectives of the present disclosure, following technical solutions are particularly adopted.

A preparation method for a polymetallic-ore beneficiation and separation reagent, including following steps:

(1) mixing a substance A, caustic soda, soda ash and sodium polysulfide, and then heating the same and performing a catalytic reaction, to render an intermediate product B, wherein the substance A includes one or more of urea, glycine, urea peroxide, ammonium cyanate and isocyanic acid; and (2) mixing the intermediate product B with trichloroisocyanuric acid, dichloroisocyanuric acid and 2-amino-3-(4-imidazolyl)propanoic acid, to render the polymetallic-ore beneficiation and separation reagent.

Preferably, a mass ratio of the substance A, the caustic soda, the soda ash and the sodium polysulfide in the step (1) is 10-15:10-35:1-5:3-5.

Preferably, in the step (1), a heating manner of the catalytic reaction is stepwise heating, and a condition of the catalytic reaction is first reacting at 300-500° C. for 2-6 h and then reacting at 800-1000° C. for 2-8 h.

Preferably, in the step (1), a catalyst for the catalytic reaction includes at least one of an $Au/TiO_2$ catalyst, a Pd—Cu/C bimetallic catalyst or a magnetic nanocatalyst.

Preferably, the magnetic nanocatalyst includes at least one of $Fe_3O_4$—$TiO_2$, $TiO_2$ and FeCo@C nanoparticles.

Preferably, in the step (2), a mass ratio of the intermediate product B, the trichloroisocyanuric acid, the dichloroisocyanuric acid and the 2-amino-3-(4-imidazolyl)propanoic acid is 1-3:1-5:0.5-1:1-2.

A polymetallic-ore beneficiation and separation reagent, prepared by the preparation method for a polymetallic-ore beneficiation and separation reagent of any one of the preceding embodiments.

Use of the polymetallic-ore beneficiation and separation reagent as described above in copper-sulfur flotation separation.

Preferably, a method of copper-sulfur flotation separation includes following steps:
(1) performing an ore grinding operation on raw copper-sulfur polymetallic ores, and adding water to prepare a pulp; and
(2) adjusting pH of the pulp, adding the polymetallic-ore beneficiation and separation reagent as a pyrite inhibitor, adding a copper collector and a frother (frothing agent), and performing roughing, concentrating and scavenging to render copper concentrates and first tailings.

Use of the polymetallic-ore beneficiation and separation reagent as described above in lead-zinc flotation separation.

Preferably, a method of lead-zinc flotation separation includes following steps:
(1) performing an ore grinding operation on raw lead-zinc polymetallic ores, and adding water to prepare a pulp; and
(2) adjusting pH of the pulp, adding the polymetallic-ore beneficiation and separation reagent as a flotation inhibitor, adding a lead collector and a frother, and performing roughing, concentrating and scavenging to render lead concentrates and second tailings.

Use of the polymetallic-ore beneficiation and separation reagent as described above in leaching gold ores.

Preferably, a method of leaching gold ores includes following steps:
(1) performing ore grinding and classification treatments on raw gold ores to render coarse-grained minerals of +0.074-3 mm and fine-grained minerals with a particle size −0.074 mm; and
(2) piling the coarse-grained minerals into heaps to render coarse-grained mineral heaps, and with the polymetallic-ore beneficiation and separation reagent as a lixiviant, subjecting the coarse-grained mineral heaps to heap leaching, and subjecting the fine-grained minerals to all-slime leaching.

Compared with the prior art, the present disclosure has following beneficial effects.
(1) The polymetallic-ore beneficiation and separation reagent provided by the present disclosure can effectively inhibit flotation of chalcopyrites, realize low-alkalinity separation of chalcopyrites and pyrites, and can solve the difficulties of a poor copper-sulfur separation effect in chalcopyrite-pyrite flotation separation with conventional flotation reagents, a low recovery rate of copper caused by a high-alkali condition, and negative impact of easy incrustation formation of calcium ions on equipment, etc.
(2) The polymetallic-ore beneficiation and separation reagent provided by the present disclosure can effectively replace the cyanide for sorting lead and zinc in complex lead-zinc polymetallic ores, and realize efficient separation of lead and zinc, can realize leaching of low-grade complex gold ores, and renders higher leaching efficiency of gold through effective binding of cyanate ions to gold, which effectively solves the technical difficulty of high toxicity brought about by the use of cyanide in the conventional beneficiation process.

DETAILED DESCRIPTION OF EMBODIMENTS

Technical solutions of the present disclosure will be described clearly and completely below in conjunction with the embodiments, while those skilled in the art would understand that the following examples described are some but not all examples of the present disclosure, and they are merely used for illustrating the present disclosure, but should not be considered as limiting the scope of the present disclosure. Based on the examples in the present disclosure, all of other examples obtained by those skilled in the art without using inventive efforts shall fall within the scope of protection of the present disclosure. Examples, for which no concrete conditions are specified, are performed according to conventional conditions or conditions recommended by manufactures. Where manufacturers of reagents or apparatuses used are not specified, they are conventional products commercially available.

The first aspect of the present disclosure provides a preparation method for a polymetallic-ore beneficiation and separation reagent, including following steps:
(1) mixing a substance A, caustic soda, soda ash and sodium polysulfide, and then heating the same and performing a catalytic reaction, to render an intermediate product B, wherein the substance A includes one or more of urea, glycine, urea peroxide, ammonium cyanate and isocyanic acid; and
(2) mixing the intermediate product B with trichloroisocyanuric acid, dichloroisocyanuric acid and 2-amino-3-(4-imidazolyl)propanoic acid, to render the polymetallic-ore beneficiation and separation reagent.

Sulfur bond (—SH) and cyano (—CN) in the polymetallic-ore beneficiation and separation reagent prepared in the present disclosure can form strong adsorption with copper ions and iron ions, so as to inhibit flotation of pyrites, and realize low-alkalinity separation of chalcopyrites and pyrites, thereby avoiding reduction of upward floatability of copper in a high-alkalinity pulp environment, and negative impact on equipment caused by incrustation formation of calcium ions.

Cyano radicals in a molecular structure bond to atoms such as sulfur and oxygen and are dissolved out in a form of cyanate, without generation of free cyanide ions. Adsorbed on surfaces of pyrites through cyanate, the reagent enhances hydrophilicity of pyrites, and prevents effect of the collector on the surfaces of pyrites; can dissolve a xanthate collector film formed on the surfaces of pyrites; and can also eliminate activated ions in the pulp. Cyanate ions ($CNO^-$) can form complexes with the activated ions of pyrites in the pulp, such as copper ions, so as to prevent pyrite from being activated, and effectively inhibit pyrites from floating upwards.

Cyanuric acid salts and derivatives thereof prepared by melt polymerization form a stable complex structure, do not easily generate free cyanides in a process of gold leaching, are low in toxicity and environment-friendly, can realize leaching of low-grade complex gold ores as a gold lixiviant, and renders higher leaching efficiency of gold through effective binding of cyanate ions to gold.

The polymetallic-ore beneficiation and separation reagent provided by the present disclosure can also realize sorting of lead and zinc in complex lead-zinc polymetallic ores, can effectively replace cyanide, and realize efficient separation of lead and zinc.

In some embodiments of the present disclosure, the polymetallic-ore beneficiation and separation reagent is formulated in a form of an aqueous solution for use, with a mass concentration being 1%-5%, for example, any point value or a range value formed by any two point values of 1%, 2%, 3%, 4%, and 5%.

In some embodiments of the present disclosure, a mass ratio of the substance A, the caustic soda, the soda ash and the sodium polysulfide in the step (1) is 10-15:10-35:1-5:3-5, including, but not limited to, any one or a ratio interval formed by any two of 10:10:1:3, 10:10:1:5, 10:10:5:5, 10:20:5:5, 11:28:1:3, 15:35:2:5, 15:20:1:3, and 15:30:5:4.

In some embodiments of the present disclosure, in the step (1), a heating manner of the catalytic reaction is stepwise heating, and a condition of the catalytic reaction is first reacting at 300-500° C. (first-stage heating temperature) for 2-6 h and then reacting at 800-1000° C. (second-stage heating temperature) for 2-8 h. By means of the stepwise heating, a reaction process is more abundant, and a catalytic effect is more adequate, which is conducive to the action of the catalyst and the reagent, and improving effectiveness of the reagent.

For example, in different embodiments, the first-stage heating temperature of the catalytic reaction may be any point value or a range value formed by any two point values of 300° C., 350° C., 400° C., 450° C., and 500° C., and a reaction time may be any point value or a range value formed by any two point values of 2 h, 3 h, 4 h, 5 h, and 6 h; the second-stage heating temperature of the catalytic reaction may be any point value or a range value formed by any two point values of 800° C., 850° C., 900° C., 950° C., and 1000° C., and a reaction time may be any point value or a range value formed by any two point values of 2 h, 3 h, 4 h, 5 h, 6 h, 7 h, and 8 h.

In some embodiments of the present disclosure, in the step (1), a catalyst for the catalytic reaction includes at least one of an $Au/TiO_2$ catalyst, a Pd—Cu/C bimetallic catalyst or a magnetic nanocatalyst.

In some embodiments of the present disclosure, the magnetic nanocatalyst includes at least one of $Fe_3O_4$—$TiO_2$, $TiO_2$ and FeCo@C nanoparticles.

In some embodiments of the present disclosure, in the step (2), a mass ratio of the intermediate product B, the trichloroisocyanuric acid, the dichloroisocyanuric acid and the 2-amino-3-(4-imidazolyl)propanoic acid is 1-3:1-5:0.5-1:1-2, including, but not limited to, any one or a ratio interval formed by any two of 1:1:0.5:1, 1:1:0.5:2, 1:1:1:1, 1:1:1:2, 1:3:0.5:1, 1:5:0.5:2, 2:2:1:1, 2:5:0.5:1, 2:5:1:2, and 3:3:0.5:1.

The second aspect of the present disclosure provides a polymetallic-ore beneficiation and separation reagent, prepared by the preparation method for a polymetallic-ore beneficiation and separation reagent of any one of the preceding embodiments.

The polymetallic-ore beneficiation and separation reagent provided by the present disclosure can realize separation of lead-zinc minerals, low-alkalinity separation of copper-sulfur minerals and leaching of gold ores after bulk flotation, with good separation effects, thus solving the technical difficulties of high toxicity brought about by use of cyanide and a large amount of lime caused by high-alkalinity separation in the conventional beneficiation process.

The third objective of the present disclosure provides use of the polymetallic-ore beneficiation and separation reagent as described above in copper-sulfur flotation separation.

In some embodiments of the present disclosure, a method of copper-sulfur flotation separation includes following steps:
(1) performing ore grinding and classification operations on raw copper-sulfur polymetallic ores containing chalcopyrites and pyrites, a content of −0.074 mm (meaning smaller than 0.074 mm) size fraction in ground products accounting for 78%-79%, and adding water to prepare a pulp; and
(2) adding lime to adjust pH of the pulp to 9-11, adding the polymetallic-ore beneficiation and separation reagent as a pyrite inhibitor, adding a copper collector and a frother, and performing roughing, concentrating and scavenging to render copper concentrates and first tailings.

In some embodiments of the present disclosure, a concentration of the pulp is 30%-35% in the step (2).

In some embodiments of the present disclosure, the copper collector includes at least one of tert-butyl allyl xanthate, n-butyl allyl xanthate and ethyl allyl xanthate.

In some preferred embodiments of the present disclosure, the copper collector includes tert-butyl allyl xanthate, n-butyl allyl xanthate and ethyl allyl xanthate, and a mass ratio of tert-butyl allyl xanthate, n-butyl allyl xanthate and ethyl allyl xanthate is 1-2:1-2:1-2, including, but not limited to, any one or a ratio interval formed by any two of 1:1:1, 1.5:1:1, 2:1:1, 1:1:2, 1.5:1:2, 2:1:2, 1:2:1, 1.5:2:1, 2:2:1, 1:2:2, 1.5:2:2, and 2:2:1.

In some embodiments of the present disclosure, the frother includes terpenic oil, in an amount of 10-50 g/t.

In some embodiments of the present disclosure, in the step (2), a flotation process of the copper-sulfur polymetallic ores includes one time of roughing, two times of concentrating and two times of scavenging, wherein amounts of the polymetallic-ore beneficiation and separation reagent in the roughing, concentrating I and concentrating II are all 300-2800 g/t; and amounts of the copper collector in the roughing, scavenging I and scavenging II are all 20-190 g/t.

In some preferred embodiments of the present disclosure, in the step (2), the amount of the polymetallic-ore beneficiation and separation reagent in the roughing is 2500-2800 g/t, for example, any point value or a range value formed by any two point values of 2500 g/t, 2600 g/t, 2700 g/t, and 2800 g/t; the amount of the polymetallic-ore beneficiation and separation reagent in the concentrating I is 800-1000 g/t, for example, any point value or a range value formed by any two point values of 800 g/t, 900 g/t, and 1000 g/t, and the amount of the polymetallic-ore beneficiation and separation reagent in the concentrating II is 300-500 g/t, for example, any point value or a range value formed by any two point values of 300 g/t, 350 g/t, 400 g/t, 450 g/t, and 500 g/t.

In some preferred embodiments of the present disclosure, in the step (2), the amount of the copper collector in the roughing is 150-200 g/t, for example, any point value or a range value formed by any two point values of 150 g/t, 160 g/t, 170 g/t, 180 g/t, 190 g/t, and 200 g/t; the amount of the copper collector in the scavenging I is 50-100 g/t, for example, any point value or a range value formed by any two point values of 50 g/t, 60 g/t, 70 g/t, 80 g/t, 85 g/t, 90 g/t, 95 g/t, and 100 g/t, and the amount of the copper collector in the scavenging II is 20-50 g/t, for example, any point value or a range value formed by any two point values of 20 g/t, 30 g/t, 40 g/t, and 50 g/t.

The fourth aspect of the present disclosure provides use of the polymetallic-ore beneficiation and separation reagent as described above in lead-zinc flotation separation.

In some embodiments of the present disclosure, a method of lead-zinc flotation separation includes following steps:
(1) performing ore grinding and classification operations on raw lead-zinc polymetallic ores, a content of −0.074 mm size fraction in ground products accounting for 72%-78%, and adding water to prepare a pulp; and (2) adjusting pH of the pulp to 10-11, adding the polymetallic-ore beneficiation and separation reagent as a flotation inhibitor, adding a lead collector and a frother, and performing roughing, concentrating and scavenging to render lead concentrates and second tailings.

In some embodiments of the present disclosure, in the step (1), the raw lead-zinc polymetallic ores have a lead content of 0.70%-2.50% and a zinc content of 6.00%-11.00%, and gangue includes quartz, biotite, calcite, muscovite and fluorite.

In some embodiments of the present disclosure, the ore grinding in the step (1) may be dry grinding or wet grinding, preferably wet grinding. The ores and water are blended and added into an ore mill to be ground, and a grinding medium, an auxiliary agent or the like may also be added during the grinding to assist the grinding, which is not limited in the present disclosure.

In some embodiments of the present disclosure, a concentration of the pulp is 30%-35% in the step (2).

In some embodiments of the present disclosure, a pH regulator is lime in the step (2). The lime not only can achieve an effect of adjusting the pH, but also can achieve an effect of inhibiting upward floating of pyrites.

In some embodiments of the present disclosure, the lead collector includes at least one of butyl xanthate, sodium diethyldithiocarbamate and sodium diisobutyldithiophosphinate.

In some preferred embodiments of the present disclosure, the lead collector includes butyl xanthate, sodium diethyldithiocarbamate and sodium diisobutyldithiophosphinate, wherein a mass ratio of butyl xanthate, sodium diethyldithiocarbamate and sodium diisobutyldithiophosphinate is 0.5-1:1-2:1-2, including, but not limited to, any one or a ratio interval formed by any two of 0.5:1:1, 1:1:1, 0.5:1:2, 1:1:2, 0.5:2:1, 1:2:1, 0.5:2:2, and 1:2:2.

In some embodiments of the present disclosure, the lead collector is added in the form of an aqueous solution, with a mass concentration of the solution being 1%-5%, for example, any point value or a range value formed by any two point values of 1%, 2%, 3%, 4%, and 5%.

In some embodiments of the present disclosure, the frother includes terpenic oil, in an amount of 35-40 g/t.

In some embodiments of the present disclosure, in the step (2), a flotation process of the lead-zinc polymetallic ores includes one time of roughing, three times of concentrating and two times of scavenging, wherein amounts of the polymetallic-ore beneficiation and separation reagent in the roughing, concentrating I and concentrating II are all 300-2500 g/t; and amounts of the lead collector in the roughing, scavenging I and scavenging II are all 30-300 g/t.

In some embodiments of the present disclosure, no reagent is added in concentrating III in the step (2).

It can be understood that there should be a corresponding stirring and inflating manner in each flotation operation, and any conventional or non-conventional manner may be used in the present disclosure, for example, mechanical impeller stirring, rotor stirring, gas evolution type, or pressure dissolved air type. Any flotation parameter or type can implement the mineral separation of the present disclosure, which is not limited in the present disclosure.

In some preferred embodiments of the present disclosure, in the step (2), the amount of the polymetallic-ore beneficiation and separation reagent in the roughing is 2000-2500 g/t, for example, any point value or a range value formed by any two point values of 2000 g/t, 2100 g/t, 2200 g/t, 2300 g/t, 2400 g/t, and 2500 g/t; the amount of the polymetallic-ore beneficiation and separation reagent in the concentrating I is 800-1000 g/t, for example, any point value or a range value formed by any two point values of 800 g/t, 875 g/t, 900 g/t, and 1000 g/t, and the amount of the polymetallic-ore beneficiation and separation reagent in the concentrating II is 300-500 g/t, for example, any point value or a range value formed by any two point values of 300 g/t, 320 g/t, 350 g/t, 400 g/t, 450 g/t, and 500 g/t.

In some preferred embodiments of the present disclosure, in the step (2), the amount of the lead collector in the roughing is 250-300 g/t, for example, any point value or a range value formed by any two point values of 250 g/t, 260 g/t, 270 g/t, 280 g/t, 290 g/t, and 300 g/t; the amount of the lead collector in the scavenging I is 100-150 g/t, for example, any point value or a range value formed by any two point values of 100 g/t, 110 g/t, 120 g/t, 130 g/t, 140 g/t, and 150 g/t, and the amount of the lead collector in the scavenging II is 30-50 g/t, for example, any point value or a range value formed by any two point values of 30 g/t, 35 g/t, 40 g/t, 45 g/t, and 50 g/t.

The fifth aspect of the present disclosure provides use of the polymetallic-ore beneficiation and separation reagent as described above in leaching gold ores.

In some embodiments of the present disclosure, a method of leaching gold ores includes following steps:
(1) performing crushing, ore grinding and classification treatments on raw gold ores to render coarse-grained minerals of +0.074-3 mm and fine-grained minerals with a particle size −0.074 mm; and
(2) piling the coarse-grained minerals into heaps to render a coarse-grained mineral heaps, and with the polymetallic-ore beneficiation and separation reagent as a lixiviant, subjecting the coarse-grained mineral heaps to heap leaching, and subjecting the fine-grained minerals to all-slime leaching.

In some embodiments of the present disclosure, in the step (2), 1900-2100 g of the polymetallic-ore beneficiation and separation reagent is added into each ton of the coarse-grained minerals in a process of the heap leaching.

In some embodiments of the present disclosure, in the step (2), 500-600 g of the polymetallic-ore beneficiation and separation reagent is added into each ton of the fine-grained minerals in a process of the all-slime leaching.

In the present disclosure, in a process of separating the copper-sulfur polymetallic ores and the lead-zinc polymetallic ores by flotation, the amounts of the reagent are relative to an amount of dry raw ores.

Some embodiments of the present disclosure are illustrated in detail below in conjunction with specific examples. Raw materials used in the examples, if not specifically stated, can be purchased commercially. An amount of the reagent added in the form of a solution in the examples refers to the amount of the reagent (such as the polymetallic-ore beneficiation and separation reagent and the collectors) contained in the solution.

Example 1

Mineral raw materials used in the present example are copper-sulfur polymetallic ores from a certain place in Jiangxi. Main metallic mineral compositions of the ores are chalcopyrites, pyrites and a small amount of molybdenites. Gangue minerals are mainly quartz, muscovite, fluorite, calcite, and the like. Average grades of major valuable elements, copper and sulfur, in the ores are 0.46% and 1.52%, respectively.

(I) Preparation of a Polymetallic-Ore Beneficiation and Separation Reagent
- (1) Urea and glycine were mixed at a mass ratio of 1:1 (substance A), then mixture was well mixed with caustic soda, soda ash and sodium polysulfide ($Na_2S_x$, CAS: 1344-08-7) at a mass ratio of 10:10:1:3. Then an $Au/TiO_2$ catalyst was added in an amount of 0.5 wt % of a total amount of the reagent. Reaction was carried out at 400° C. for 3 h, then temperature continued to be raised to 900° C., and reaction was carried out for 5 h, to render an intermediate product B.
- (2) The intermediate product B was mixed with dichloroisocyanuric acid, trichloroisocyanuric acid, and 2-amino-3-(4-imidazolyl)propanoic acid at a mass ratio of 1:1:1:1, to render the polymetallic-ore beneficiation and separation reagent, which was formulated into an aqueous solution with a mass concentration of 2% at a room temperature for later use.

(II) Preparation of a Copper Collector

The copper collector was prepared by fully mixing tert-butyl allyl xanthate, n-butyl allyl xanthate and ethyl allyl xanthate at a mass ratio of 1:1:1.

(III) Flotation Separation Includes Following Steps.
- (1) Treatment on raw ores: Bulk-flotation concentrates containing chalcopyrites and pyrites were fed to ore grinding and classification operations, wherein −0.074 mm in ground products accounted for 78.50%.
- (2) Operation of copper-sulfur flotation separation: A pulp was conveyed into a flotation machine, a concentration of the pulp was adjusted to 31% by adding water, pH of the pulp was adjusted to 10 with lime in an amount of 2 kg/t, and operations of one time of roughing, two times of concentrating and two times of scavenging were performed, wherein an inflatable flotation machine was used throughout the flotation.
- (2.1) Roughing: Into the pulp, three flotation reagents, namely, the polymetallic-ore beneficiation and separation reagent (as an inhibitor), the copper collector and a frother (terpenic oil), were sequentially added in amounts of 2500 g/t, 180 g/t, and 35 g/t, respectively; and after the flotation was ended, frothed products were collected as roughing copper concentrates, and an underflow pulp entered a next scavenging step.
- (2.2) First time of scavenging (scavenging I): Into the roughing underflow pulp, the copper collector was charged in an amount of 100 g/t; and after flotation was ended, frothed products were collected as scavenging-I copper concentrates, and an underflow pulp entered a next scavenging step.
- (2.3) Second time of scavenging (scavenging II): Into the scavenging I underflow pulp, the copper collector was charged in an amount of 30 g/t; and after flotation was ended, frothed products were collected as scavenging-II copper concentrates, and an underflow pulp was final tailings.
- (2.4) First time of concentrating (concentrating I): Into the roughing copper concentrates, the polymetallic-ore beneficiation and separation reagent was added in an amount of 800 g/t as an inhibitor; and after flotation was ended, frothed products were collected as primary-concentrating copper concentrates, and concentrated froth entered a next concentrating step.
- (2.5) Second time of concentrating (concentrating II): Into the primary-concentrating froth, the polymetallic-ore beneficiation and separation reagent was charged in an amount of 300 g/t as an inhibitor; and after flotation was ended, frothed products were collected as final copper concentrates.

It was obtained upon detection that a copper content in the copper concentrates of the present example was 23.55%, in which a copper recovery rate was 93.48%.

Example 2

Mineral raw materials used in the present example are copper-sulfur polymetallic ores from a certain place in Yunnan. Main metallic mineral compositions of the ores are chalcopyrites, pyrites and a small amount of pyrrhotites. Gangue minerals are mainly quartz, muscovite, fluorite, calcite, and the like. Average grades of major valuable elements, copper and sulfur, in the ores are 0.50% and 1.33%, respectively.

(I) Preparation of a Polymetallic-Ore Beneficiation and Separation Reagent
- (1) Urea, glycine and urea peroxide were mixed at a mass ratio of 1:0.5:0.2 (substance A), then mixture was well mixed with caustic soda, soda ash and sodium polysulfide (CAS: 1344-08-7) at a mass ratio of 15:35:2:5. Then an $Au/TiO_2$ catalyst was added in an amount of 0.4 wt % of a total amount of the reagent. Reaction was carried out at 350° C. for 5 h, then temperature continued to be raised to 900° C., and reaction was carried out for 3 h, to render an intermediate product B; and
- (2) The intermediate product B was mixed with dichloroisocyanuric acid, trichloroisocyanuric acid, and 2-amino-3-(4-imidazolyl)propanoic acid at a mass ratio of 2:2:1:1, to render the polymetallic-ore beneficiation and separation reagent, which was formulated into an aqueous solution with a mass concentration of 2% at a room temperature for later use.

(II) Preparation of a Copper Collector

The copper collector was prepared by fully mixing tert-butyl allyl xanthate, n-butyl allyl xanthate and ethyl allyl xanthate at a mass ratio of 2:1:1.

(III) Flotation Separation Includes Following Steps.
- (1) Treatment on raw ores: Bulk-flotation concentrates containing chalcopyrites and pyrites were fed to ore grinding and classification operations, wherein −0.074 mm in ground products accounted for 79.00%.
- (2) Operation of copper-sulfur flotation separation: A pulp was conveyed into a flotation machine, a concentration of the pulp was adjusted to 35% by adding water, pH of the pulp was adjusted to 10 with lime in an amount of 1.5 kg/t, and operations of one time of roughing, two times of concentrating and two times of scavenging were performed, wherein an inflatable flotation machine was used throughout the flotation.
- (2.1) Roughing: Into the pulp, three flotation reagents, namely, the polymetallic-ore beneficiation and separation reagent (as an inhibitor), the copper collector and a frother (terpenic oil), were sequentially added in amounts of 2800 g/t, 190 g/t, and 10 g/t, respectively; and after flotation was ended, frothed products were collected as roughing copper concentrates, and an underflow pulp entered a next scavenging step.
- (2.2) First time of scavenging (scavenging I): Into the roughing underflow pulp, the copper collector was charged in an amount of 85 g/t; and after flotation was ended, frothed products were collected as scavenging-I copper concentrates, and an underflow pulp entered a next scavenging step.

(2.3) Second time of scavenging (scavenging II): Into the scavenging-I underflow pulp, the copper collector was charged in an amount of 20 g/t; and after flotation was ended, frothed products were collected as scavenging-II copper concentrates, and an underflow pulp was final tailings.

(2.4) First time of concentrating (concentrating I): Into the roughing copper concentrates, the polymetallic-ore beneficiation and separation reagent was added in an amount of 1000 g/t as an inhibitor; and after flotation was ended, frothed products were collected as primary-concentrating copper concentrates, and concentrated froth entered a next concentrating step.

(2.5) Second time of concentrating (concentrating II): Into the primary-concentrating froth, the polymetallic-ore beneficiation and separation reagent was charged in an amount of 450 g/t as an inhibitor; and after flotation was ended, frothed products were collected as final copper concentrates.

It was obtained upon detection that a copper content in the copper concentrates of the present example was 22.30%, in which a copper recovery rate was 94.15%.

Example 3

Mineral raw materials used in the present example are tin-lead-zinc polymetallic ores from a certain place in Guangxi. Main metallic mineral compositions of the ores are jamesonite, marmatite, and pyrite. Gangue minerals are mainly quartz, muscovite, and the like. Average grades of major valuable elements, lead and zinc, in the ores are 2.20% and 10.57%, respectively.

(I) Preparation of a Polymetallic-Ore Beneficiation and Separation Reagent (1) Urea, caustic soda, soda ash and sodium polysulfide (CAS: 1344-08-7) were well mixed at a mass ratio of 10:20:5:5, then a $Fe_3O_4$—$TiO_2$ nanoparticle catalyst was added in an amount of 0.2 wt % of a total amount of the reagent. Reaction was carried out at 300° C. for 6 h, then temperature continued to be raised to 800° C., and reaction was carried out for 8 h, to render an intermediate product B.

(2) The intermediate product B was mixed with dichloroisocyanuric acid, trichloroisocyanuric acid, and 2-amino-3-(4-imidazolyl)propanoic acid at a mass ratio of 3:3:0.5:1, to render the polymetallic-ore beneficiation and separation reagent, which was formulated into an aqueous solution with a mass concentration of 2% at a room temperature for later use.

(II) Preparation of a Lead Collector

The lead collector was prepared by fully mixing butyl xanthate, sodium diethyldithiocarbamate and sodium diisobutyldithiophosphinate at a mass ratio of 0.5:1:2.

(III) Flotation Separation Includes Following Steps.

(1) Treatment on raw ores: Raw ores containing jamesonite, marmatite and pyrite were fed to ore grinding and classification operations, wherein −0.074 mm in classified products accounted for 72.50%.

(2) Operation of flotation separation: A pulp was conveyed into a flotation machine, a concentration of the pulp was adjusted to 32% by adding water, pH of the pulp was adjusted to 11 with lime in an amount of 1.8 kg/t, and operations of one time of roughing, three times of concentrating and two times of scavenging were performed, wherein an inflatable flotation machine was used throughout the flotation.

(2.1) Roughing: Into the pulp, three flotation reagents, namely, the polymetallic-ore beneficiation and separation reagent (as an inhibitor), the lead collector and a frother (terpenic oil), were sequentially added in amounts of 2000 g/t, 250 g/t, and 35 g/t, respectively; and after flotation was ended, frothed products were collected as roughing lead concentrates, and an underflow pulp entered a next scavenging step.

(2.2) First time of scavenging (scavenging I): Into the roughing underflow pulp, the lead collector was charged in an amount of 120 g/t; and after flotation was ended, frothed products were collected as primary-scavenging lead concentrates, and an underflow pulp entered a next scavenging step.

(2.3) Second time of scavenging (scavenging II): Into the scavenging-I underflow pulp, the lead collector was charged in an amount of 35 g/t; and after flotation was ended, frothed products were collected as secondary-scavenging lead concentrates, and primary-scavenging and secondary-scavenging lead concentrates were returned in turn to an upper-level operation, and an underflow pulp was final tailings.

(2.4) First time of concentrating (concentrating I): Into the roughing lead concentrates, the polymetallic-ore beneficiation and separation reagent was added in an amount of 900 g/t as an inhibitor; and after flotation was ended, frothed products were collected as primary-concentrating lead concentrates, and concentrated froth entered a next concentrating step.

(2.5) Second time of concentrating (concentrating II): Into the primary-concentrating froth, the polymetallic-ore beneficiation and separation reagent was charged in an amount of 300 g/t as an inhibitor; and after flotation was ended, secondary-concentrating frothed products were collected to enter next concentrating.

(2.6) Third time of concentrating (concentrating III): The secondary-concentrating froth was subjected to blank flotation without addition of a reagent; and after flotation was ended, frothed products were collected as final lead concentrates.

It was obtained upon detection that a lead content in the lead concentrates of the present example was 21.21%, in which a lead recovery rate was 88.95%, and the lead concentrates contained 3.25% of zinc.

Example 4

Mineral raw materials used in the present example are tin-lead-zinc polymetallic ores from a certain place in Guangxi. Main metallic mineral compositions of the ores are galena, marmatite and pyrite. Gangue minerals are mainly quartz, muscovite, fluorite, and the like. Average grades of major valuable elements, lead and zinc, in the ores are 0.75% and 6.54%, respectively.

(I) Preparation of a Polymetallic-Ore Beneficiation and Separation Reagent (1) Urea, ammonium cyanate and isocyanic acid were mixed and formulated at a mass ratio of 1:0.5:0.1 (substance A), then mixture was well mixed with caustic soda, soda ash and sodium polysulfide (CAS: 1344-08-7) at a mass ratio of 11:28:1:3. Then a Pd—Cu/C bimetallic catalyst was added in an amount of 0.3 wt % of a total amount of the reagent. Reaction was carried out at 400° C. for 3 h, then temperature continued to be raised to 950° C., and reaction was carried out for 6 h, to render an intermediate product B.

(2) The intermediate product B was mixed with dichloroisocyanuric acid, trichloroisocyanuric acid, and 2-amino-3-(4-imidazolyl)propanoic acid at a mass ratio of 1:3:0.5:1, to render the polymetallic-ore beneficiation and separation reagent, which was formulated into an aqueous solution with a mass concentration of 2% at a room temperature for later use.

(II) Preparation of a Lead Collector

The lead collector was prepared by fully mixing butyl xanthate, sodium diethyldithiocarbamate and sodium diisobutyldithiophosphinate at a mass ratio of 1:1:2.

(III) Flotation Separation Includes Following Steps.
  (1) Treatment on raw ores: Raw ores containing galena, marmatite and pyrite were fed to ore grinding and classification operations, wherein −0.074 mm in classified products accounted for 78.00%; and
  (2) Operation of flotation separation: A pulp was conveyed into a flotation machine, a concentration of the pulp was adjusted to 35% by adding water, pH of the pulp was adjusted to 11 with lime in an amount of 2 kg/t, and operations of one time of roughing, three times of concentrating and two times of scavenging were performed, wherein an inflatable flotation machine was used throughout the flotation.
  (2.1) Roughing: Into the pulp, three flotation reagents, namely, the polymetallic-ore beneficiation and separation reagent (as an inhibitor), the lead collector and a frother (terpenic oil), were sequentially added in amounts of 2500 g/t, 300 g/t, and 40 g/t, respectively; and after flotation was ended, frothed products were collected as roughing lead concentrates, and an underflow pulp entered a next scavenging step.
  (2.2) First time of scavenging (scavenging I): Into the roughing underflow pulp, the lead collector was charged in an amount of 100 g/t; and after flotation was ended, frothed products were collected as primary-scavenging lead concentrates, and an underflow pulp entered a next scavenging step.
  (2.3) Second time of scavenging (scavenging II): Into the scavenging-I underflow pulp, the lead collector was charged in an amount of 30 g/t; and after flotation was ended, frothed products were collected as secondary-scavenging lead concentrates, and primary-scavenging and secondary-scavenging lead concentrates were returned in turn to an upper-level operation, and an underflow pulp was final tailings.
  (2.4) First time of concentrating (concentrating I): Into the roughing lead concentrates, the polymetallic-ore beneficiation and separation reagent was added in an amount of 875 g/t as an inhibitor; and after flotation was ended, frothed products were collected as primary-concentrating lead concentrates, and concentrated froth entered a next concentrating step.
  (2.5) Second time of concentrating (concentrating II): Into the primary-concentrating froth, the polymetallic-ore beneficiation and separation reagent was charged in an amount of 320 g/t as an inhibitor; and after flotation was ended, frothed products were collected to undergo a next concentrating operation.
  (2.6) third time of concentrating (concentrating III): The secondary-concentrating froth was subjected to blank flotation without addition of a reagent; and after flotation was ended, frothed products were collected as final lead concentrates.

It was obtained upon detection that a lead content in the lead concentrates of the present example was 24.14%, in which a lead recovery rate was 89.58%, and the lead concentrates contained 3.88% of zinc.

Example 5

In the present example, mineral raw materials are selected from high-mud and low-grade gold ores from a certain place in Shandong. A content of gold in the ores was 0.35 g/t. Metal minerals in the ores are mainly pyrite and part of chalcopyrite, and nonmetallic minerals are mainly quartz and calcite.

(I) Preparation of a Polymetallic-Ore Beneficiation and Separation Reagent
  (1) Urea and glycine were mixed and formulated at a mass ratio of 1:0.5 (substance A), then mixture was well mixed with caustic soda, soda ash and sodium polysulfide (CAS: 1344-08-7) at a mass ratio of 15:20:1:3. Then $Fe_3O_4$—$TiO_2$ nanoparticles as catalyst were added in an amount of 0.2 wt % of a total amount of the reagent. Reaction was carried out at 400° C. for 5 h, then temperature continued to be raised to 900° C., and reaction was carried out for 6 h, to render an intermediate product B.
  (2) The intermediate product B was mixed with dichloroisocyanuric acid, trichloroisocyanuric acid, and 2-amino-3-(4-imidazolyl)propanoic acid at a mass ratio of 1:5:0.5:2, to render the polymetallic-ore beneficiation and separation reagent, which was formulated into an aqueous solution with a mass concentration of 2% at a room temperature for later use.

(II) Leaching of the Gold Ores Includes Following Steps.
  (1) Crushing operation: Raw ore minerals were subjected to a crushing operation to render qualified crushed materials.
  (2) Ore grinding and classification operations: The above qualified crushed materials were sequentially fed into a ore grinding and classification system, ground products were fed into a vibrating screen to undergo a classification operation, a size of screen openings of the vibrating screen being 3 mm; oversize products of the vibrating screen were returned to an ore mill to be ground again, and undersize products were fed into a spiral sluice to be classified, so as to render coarse-grained minerals with a particle size of +0.074-3 mm and fine-grained minerals with a particle size of −0.074 mm.
  (3) Quick lime was added to adjust a pH value of the coarse-grained minerals to 11 and then the coarse-grained minerals were piled into heaps to render coarse-grained mineral heaps sized to be 6 m in height, 6 m in width, and 20 m in length.
  (4) 1900 g of the polymetallic-ore beneficiation and separation reagent were added as a lixiviant to each ton of the coarse-grained minerals, and heap leaching was carried out for 24 days.
  (5) A pregnant solution produced from the heap leaching was collected, and subjected to static adsorption using coconut shell carbon to separate out a gold-loaded carbon product and a barren solution, and the barren solution was returned to recycle.
  (6) Into 1 kg of the fine-grained minerals thickened by a thickener, quick lime was added, a pH value of the fine-grained minerals was adjusted to 11, and 550 g of the polymetallic-ore beneficiation and separation reagent were added as a lixiviant to each ton of the fine-grained minerals to carry out all-slime leaching for 24 h.

Through the above steps, a leaching rate of the coarse-grained materials was 79.43%, and a leaching rate of the fine-grained materials was 85.33%.

Example 6

In the present example, mineral raw materials are selected from high-mud and low-grade gold ores from a certain place in Jilin. A content of gold in the ores was 0.45 g/t. Metal minerals in the ores are mainly pyrite and part of chalcopyrite, and nonmetallic minerals are mainly quartz, calcite, fluorite, and so on.

(I) Preparation of a Polymetallic-Ore Beneficiation and Separation Reagent
  (1) Urea and glycine were mixed and formulated at a mass ratio of 1:0.5 (substance A), then mixture was well mixed with caustic soda, soda ash and sodium polysulfide (CAS: 1344-08-7) at a mass ratio of 15:30:5:4. Then FeCo@C nanoparticles as catalyst were added in an amount of 0.3 wt % of a total amount of the reagent. Reaction was carried out at 400° C. for 3 h, then temperature continued to be raised to 900° C., and reaction was carried out for 4 h, to render an intermediate product B.
  (2) The intermediate product B was mixed with dichloroisocyanuric acid, trichloroisocyanuric acid, and 2-amino-3-(4-imidazolyl)propanoic acid at a mass ratio of 1:5:0.5:2, to render the polymetallic-ore beneficiation and separation reagent, which was formulated into an aqueous solution with a mass concentration of 2% at a room temperature for later use.

(II) Leaching of the Gold Ores Includes Following Steps.
  (1) Crushing operation: Raw ore minerals were subjected to a crushing operation to render qualified crushed materials.
  (2) Ore grinding and classification operations: The above qualified crushed materials were sequentially fed into a ore grinding and classification system, ground products were fed into a vibrating screen to undergo a classification operation, a size of screen openings of the vibrating screen being 3 mm; oversize products of the vibrating screen were returned to an ore mill to be ground again, and undersize products were fed into a spiral sluice to be classified, so as to render coarse-grained minerals with a particle size of +0.074-3 mm and fine-grained minerals with a particle size of −0.074 mm.
  (3) Quick lime was added to adjust a pH value of the coarse-grained minerals to 11 and then the coarse-grained minerals were piled into heaps to render coarse-grained mineral heaps sized to be 5 m in height, 8 m in width, and 15 m in length.
  (4) 2100 g of the polymetallic-ore beneficiation and separation reagent were added as a lixiviant to each ton of the coarse-grained minerals, and heap leaching was carried out for 26 days.
  (5) A pregnant solution produced from the heap leaching was collected, and subjected to static adsorption using coconut shell carbon to separate out a gold-loaded carbon product and a barren solution, and the barren solution was returned to recycle.
  (6) Into 1 kg of the fine-grained minerals thickened by a thickener, quick lime was added, a pH value of the fine-grained minerals was adjusted to 11, and 600 g of the polymetallic-ore beneficiation and separation reagent were added as a lixiviant to each ton of the fine-grained minerals to carry out all-slime leaching for 24 h.

Through the above steps, a leaching rate of the coarse-grained materials was 84.17%, and a leaching rate of the fine-grained materials was 86.88%.

Comparative Example 1

The present comparative example differs from Example 1 merely in different inhibitor and different amount of lime added in roughing and concentrating stages. In Comparative Example 1, the inhibitor in the roughing, the concentrating I and the concentrating II is sodium hypochlorite and sodium sulfite at a mass ratio of 2:1, in amounts of 2850 g/t, 1000 g/t and 300 g/t, respectively, the amount of the lime for the roughing is 20 kg/t, the pH of the pulp is 13, and other conditions are the same as those in Example 1.

The copper grade in the copper concentrates finally obtained is 20.15%, and the recovery rate of copper is 85.97%.

Comparative Example 2

The present comparative example differs from Example 2 merely in that no intermediate product B is added into the inhibitor, and other conditions are the same as those in Example 2.

The copper grade in the copper concentrates finally obtained is 21.58%, and the recovery rate of copper is 89.77%.

Comparative Example 3

The present comparative example differs from Example 3 merely in that the inhibitor added in roughing and concentrating stages is different, wherein the beneficiation and separation reagent (inhibitor) in the roughing, concentrating I and concentrating II in Comparative Example 3 is sodium cyanide, and other conditions are the same as those in Example 3.

It is obtained upon detection that the lead content in the lead concentrates of the present comparative example is 21.45%, in which the lead recovery rate is 86.85%, and the lead concentrates contains 4.89% of zinc.

Comparative Example 4

The present comparative example differs from Example 4 merely in that no intermediate product B is added into the inhibitor, and other conditions are the same as those in Example 4.

It is obtained upon detection that the lead content in the lead concentrates of the present comparative example is 20.58%, in which the lead recovery rate is 85.59%, and the lead concentrates contain 4.50% of zinc.

Comparative Example 5

The present comparative example differs from Example 5 merely in that the lixiviant added in the leaching process is different, wherein the lixiviant in Comparative Example 5 is sodium cyanide, and other conditions are the same as those in Example 5.

Through the above steps, the leaching rate of the coarse-grained materials is 78.20%, and the leaching rate of the fine-grained materials is 83.58%.

Comparative Example 6

The present comparative example differs from Example 6 merely in that the lixiviant added in the leaching process is different, the lixiviant in Comparative Example 6 is not added with the intermediate product B, and amounts of the lixiviant for coarse-grained heap leaching and all-slime leaching are 2100 g/t and 850 g/t, respectively, and other conditions are the same as those in Example 6.

Through the above steps, the leaching rate of the coarse-grained materials is 81.45%, and the leaching rate of the fine-grained materials is 84.25%.

Although the present disclosure has been illustrated and described with specific examples, it should be realized that the various examples above are merely used for illustrating the technical solutions of the present disclosure, rather than limiting the present disclosure; those ordinarily skilled in the art should understand that, without departing from the spirit and scope of the present disclosure, they still could modify the technical solutions described in various preceding examples, or make equivalent substitutions to some or all of the technical features therein; and these modifications or substitutions do not make the corresponding technical solutions essentially depart from the scope of the technical solutions of various examples of the present disclosure; therefore, it means that the attached claims cover all of these substitutions and modifications within the scope of the present disclosure.

The invention claimed is:

1. A preparation method for a polymetallic-ore beneficiation and separation reagent, comprising steps of:
   (1) mixing a substance A, caustic soda, soda ash and sodium polysulfide, and then heating a mixture and performing a catalytic reaction, to render an intermediate product B, wherein the substance A comprises one or more of urea, glycine, urea peroxide, ammonium cyanate and isocyanic acid; and
   (2) mixing the intermediate product B with trichloroisocyanuric acid, dichloroisocyanuric acid and 2-amino-3-(4-imidazolyl)propanoic acid, to render the polymetallic-ore beneficiation and separation reagent,
   wherein a catalyst for the catalytic reaction comprises at least one of an $Au/TiO_2$ catalyst, a Pd—Cu/C bimetallic catalyst or a magnetic nanocatalyst,
   wherein the magnetic nanocatalyst comprises at least one of $Fe_3O_4$—$TiO_2$, $TiO_2$ and FeCo@C nanoparticles.

2. The preparation method for a polymetallic-ore beneficiation and separation reagent according to claim 1, comprising at least one of following characteristics (1)-(3):
   (1) a mass ratio of the substance A, the caustic soda, the soda ash and the sodium polysulfide is 10-15:10-35:1-5:3-5;
   (2) a heating manner of the catalytic reaction is stepwise heating, and a condition of the catalytic reaction is first reacting at 300-500° C. for 2-6 h and then reacting at 800-1000° C. for 2-8 h; and
   (3) a mass ratio of the intermediate product B, the trichloroisocyanuric acid, the dichloroisocyanuric acid and the 2-amino-3-(4-imidazolyl)propanoic acid is 1-3:1-5:0.5-1:1-2.

3. A polymetallic-ore beneficiation and separation reagent, prepared by the preparation method for a polymetallic-ore beneficiation and separation reagent according to claim 1.

4. Use of the polymetallic-ore beneficiation and separation reagent according to claim 3 in copper-sulfur flotation separation.

5. The use of the polymetallic-ore beneficiation and separation reagent in copper-sulfur flotation separation according to claim 4, wherein a method of the copper-sulfur flotation separation comprises steps of:
   (1) performing an ore grinding operation on raw copper-sulfur polymetallic ores, and adding water to prepare a pulp; and
   (2) adjusting pH of the pulp, adding the polymetallic-ore beneficiation and separation reagent as a pyrite inhibitor, adding a copper collector and a frother, and performing roughing, concentrating and scavenging to render copper concentrates and first tailings.

6. Use of the polymetallic-ore beneficiation and separation reagent according to claim 3 in lead-zinc flotation separation.

7. The use of the polymetallic-ore beneficiation and separation reagent in lead-zinc flotation separation according to claim 6, wherein a method of the lead-zinc flotation separation comprises steps of:
   (1) performing an ore grinding operation on raw lead-zinc polymetallic ores, and adding water to prepare a pulp; and
   (2) adjusting pH of the pulp, adding the polymetallic-ore beneficiation and separation reagent as a flotation inhibitor, adding a lead collector and a frother, and performing roughing, concentrating and scavenging to render lead concentrates and second tailings.

8. Use of the polymetallic-ore beneficiation and separation reagent according to claim 3 in leaching gold ores.

9. The use of the polymetallic-ore beneficiation and separation reagent in leaching gold ores according to claim 8, wherein a method of the leaching gold ores comprises steps of:
   (1) performing ore grinding and classification treatments on raw gold ores to render coarse-grained minerals of +0.074-3 mm and fine-grained minerals with a particle size −0.074 mm; and
   (2) piling the coarse-grained minerals into heaps to render coarse-grained mineral heaps, and with the polymetallic-ore beneficiation and separation reagent as a lixiviant, subjecting the coarse-grained mineral heaps to heap leaching, and subjecting the fine-grained minerals to all-slime leaching.

* * * * *